Aug. 1, 1967   L. D. STATHAM ETAL   3,333,464
UNIVERSAL TRANSDUCING CELL
Filed Nov. 30, 1964   3 Sheets-Sheet 1

INVENTORS
LOUIS D. STATHAM
WALTER H. EISELE
BY Philip Subkow
ATTORNEY

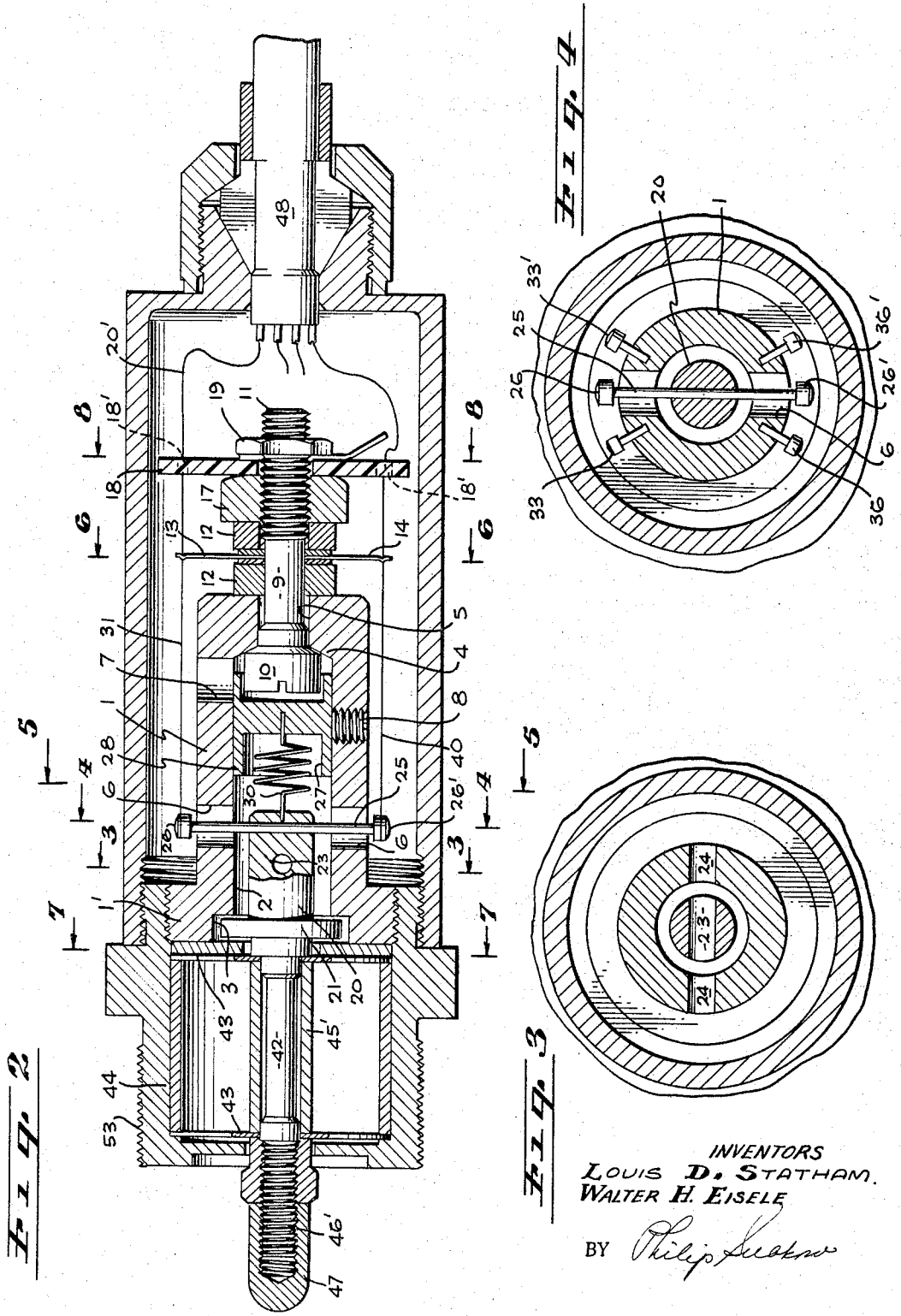

Aug. 1, 1967   L. D. STATHAM ETAL   3,333,464
UNIVERSAL TRANSDUCING CELL
Filed Nov. 30, 1964   3 Sheets-Sheet 3
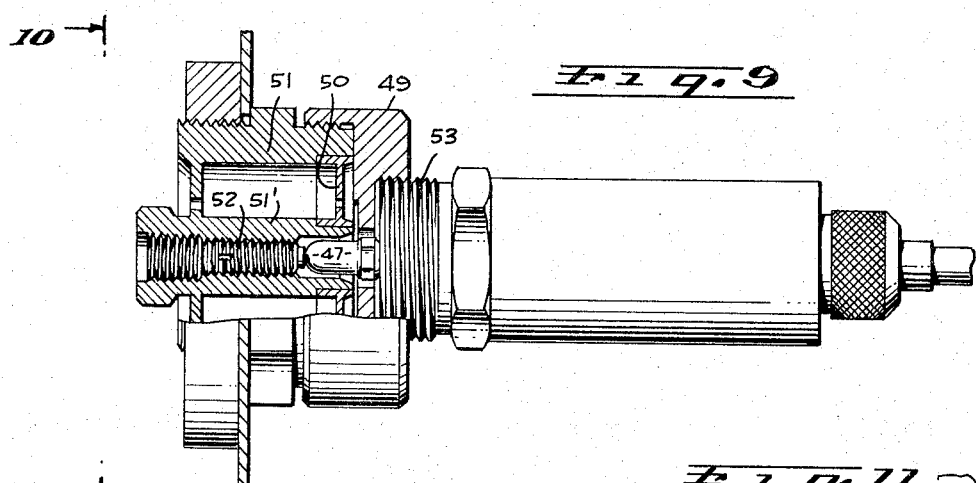
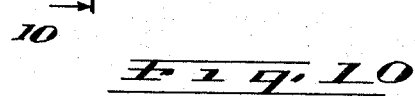
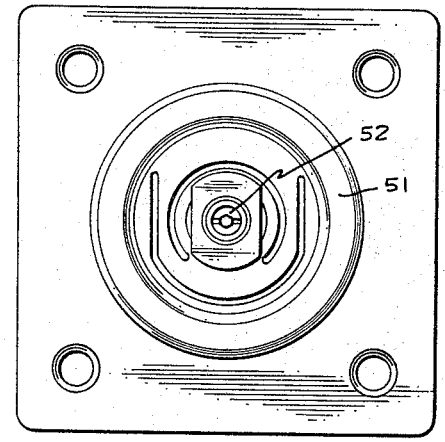
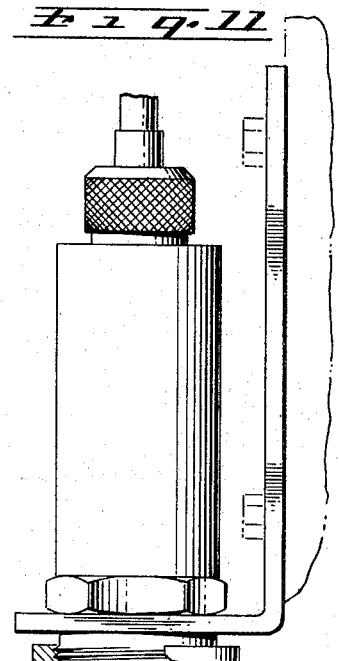
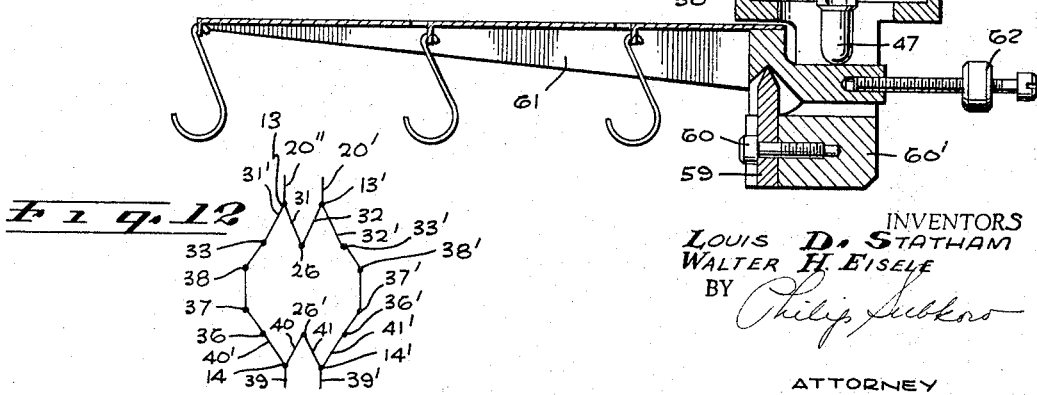
INVENTORS
LOUIS D. STATHAM
WALTER H. EISELE
BY Philip Subkow
ATTORNEY

United States Patent Office 3,333,464
Patented Aug. 1, 1967

3,333,464
UNIVERSAL TRANSDUCING CELL
Louis D. Statham, Los Angeles, and Walter H. Eisele, Pacific Palisades, Calif., assignors to Statham Instruments, Inc., Los Angeles, Calif., a corporation of California
Filed Nov. 30, 1964, Ser. No. 414,778
4 Claims. (Cl. 73—141)

This invention relates to improvements in unbonded electrical resistance strain wire transducers. It is particularly directed to improvements in transducers of the type shown in the Statham Patent 3,058,348, and the Statham patents referred to therein. In such transducers, the wires, subjected to strain responsive to a condition to be sensed, are connected to a wire mounting which moves under the influence of the condition, and are then stretched to a yieldable support, and then to a fixed point to form a pair of wires so that when the first point moves, one of the wires of the pair is increased in tension and the other is reduced in tension. In such transducers, the initial tension in the wires must be such that on the extreme excursion of the movable wire mounting in the range in which the instrument is to be effective, should not result in any of the wires becoming slack. For this purpose, it is desirable that the tensions in the wires at the initial so-called zero position, be at a desirable level of strain.

It is thus necessary that care be taken in mounting the wires, that the proper levels of strain are imposed in the wires. The transducer may be either a unidirectional transducer, that is, one in which the movable wire support is free to move axially in only one direction from the null point, i.e. when the condition to be sensed is applied. In such case, each of the wires of the pair may be wound with equal tension provided the initial tension is sufficient so that the wires, whose tension is reduced on the excursion of the movable wire support, does not have it's tension excessively reduced. The wire should not go slack at the extreme excursion of the movable wire support, and preferably have some material residual tension.

Alternatively, the wires of the pair may be wound with unequal tension so that the wire under the greater tension is not excessively relaxed in tension by the movement of the movable point, and the companion wire of the pair is not excessively increased in tension so as to rupture it or otherwise injure it. On reverse motion, the wire tension should not be excessively reduced in tension, and the companion wire not excessively increased in tension for the same reasons.

The transducer may also be a bidirectional transducer, that is, the movable wire support may be free to move axially to and fro from the null point, that is, in two directions. In such case, the wires of the pair may be wound with equal tension provided that the initial tension is sufficiently high and either wire is not reduced in tension excessively, as stated above, for the unidirectional transducer when the movable member has made its extreme excursions in either direction.

Additionally, it is desirable with the above ends in view, that the lengths of the wires of the pair be essentially alike, so that as close as practical, the resistances of the two wires in the pair shall be substantially equal except as may result from the differences in strain imposed, as specified above.

It is an object of our invention to provide means for mounting the wires under tension on their supports, so as to provide for equal span of wires of the pair of wires.

It is another object of our invention to provide means to bias the wires separately under conditions of no deflection of the movable wire support by the condition to be sensed.

In the transducers of the previously referred to Statham patents, winding the wires under initial winding tension, deflection of the spring forming the yieldable support occurs so as to introduce initial tension of the wire under no load conditions.

Additionally, if the movable wire support is supported on a flexure, for example, a force summing means which is sufficiently compliant, the movable wire support may also be deflected. Variations in manual manipulation of the wires by the operator may cause different degrees of tension to be imposed on wires to cause differences in the winding tension, and the wires under no load conditions may vary from transducer to transducer. The winding tension causes a deflection of the yieldable connection in any flexure in a force summing means to which the movable member point is connected.

In the preferred embodiment of our invention, we provide means for positioning the movable wire support centrally between flat springs which are mounted co-planar so that a line perpendicular to the plane of the flat springs, joins the movable wire support substantially midway between the points of attachment of the wires to the springs. We also provide two fixed wire mounting pins aligned with the movable support, in the locked position, so that the plane through the axis of the support is substantially parallel to the plane of the springs. Wires are wound from each of the springs, one to the fixed support and one to the movable support providing two wires in each of the two pairs of wires.

We provide means to releasably lock the movable wire support under no load conditions in alignment with a fixed wire support, and along the line perpendicular to the axis of the transducer at a predetermined distance from the yieldable support when the yieldable support is in an undeflected position. In this position, the yieldable point is at a fixed distance from the movable wire support and the fixed wire support on which the wires are mounted. The wires are stretched in tension between the fixed and movable supports, and the yieldable supports. The yieldable support deflects due to the tension imposed on the wires. The tension in the wires of the pair are thus equalized.

We provide means for unlocking the movable wire support, and the tension in the wire causes some deflection of the flexure on which the movable support is mounted, and a reduction in the deflection of the yieldable support.

We provide means for introducing a spring bias adapted to remove the deflection of the flexure and return it to the no load condition, with the electrical resistances and the wires extending from the yieldable supports, equalized.

When it is desired that the initial strain level in the wires at the null point be unequal, means for adjusting the bias of the wires referred to above, may also be used to adjust the bias for such purpose.

Such transducers are particularly adapted for bidirectional service wherein the movable element may be displaced in either direction depending on the direction which the condition to be sensed is applied.

One advantageous added feature and object of our invention is the universality of the transducer of our invention, in that, because of its construction, various adapters may be mounted upon the case of the transducer. Means are provided whereby these adapters may be mounted so as not to deflect the movable point when no load is imposed on the adapter, that is, the conditions to be sensed is at zero level. It may thus be converted from a dynamometer, that is, a deflection measuring device into a pressure gage, load cell, weighting device or accelerometer, or other form of transducer in which the condition sensed causes a deflection of the armature, depending on the nature of the adapter.

These and other objectives will be further described in connection with the drawings of which:

FIG. 2 is a longitudinal section through the transducer shown in FIG. 1;

Figure 5:
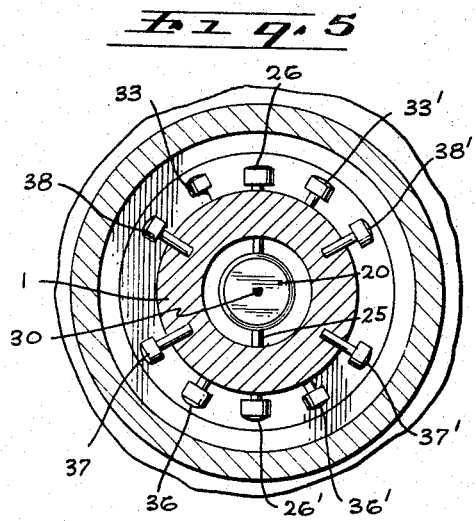
Figure 6:
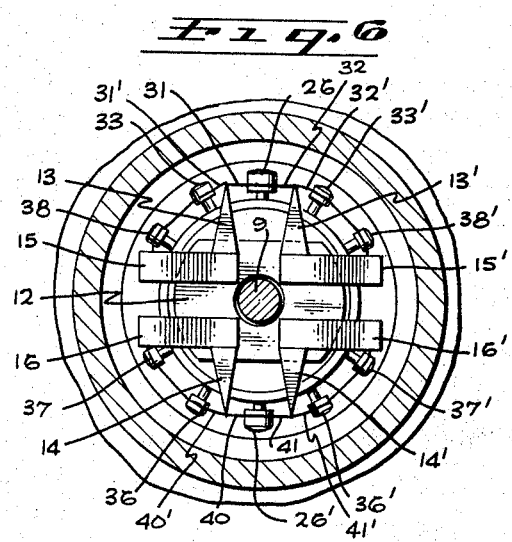
Figure 7:
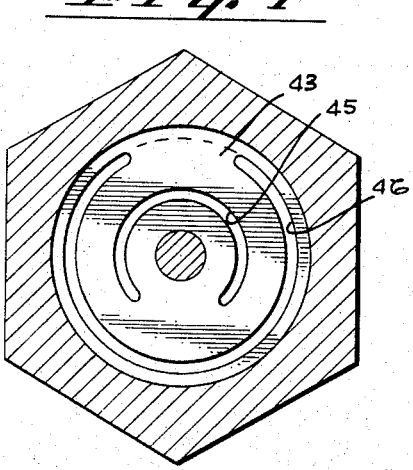
Figure 8:
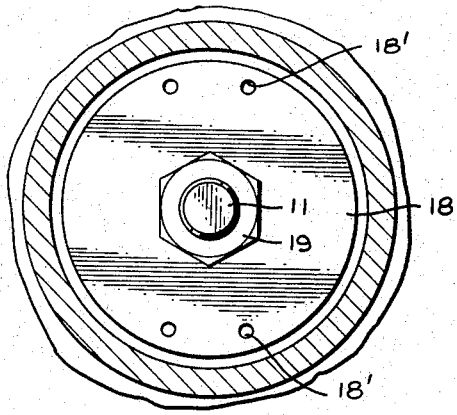

FIG. 3 is a section taken on line 3—3 of FIG. 2;
FIG. 4 is a section taken on line 4—4 of FIG. 2;
FIG. 5 is a section taken on line 5—5 of FIG. 2;
FIG. 6 is a section taken on line 6—6 of FIG. 2;
FIG. 7 is a section taken on line 7—7 of FIG. 2;
FIG. 8 is a section taken on line 8—8 of FIG. 2;
FIG. 9 shows the transducer of FIG. 1 with an adapter which converts it into a load cell;

FIG. 10 is a view taken along line 10—10 of FIG. 9;
FIG. 11 shows the application of the transducer to a weighing device; and FIG. 12 is a schematic wiring diagram.

Referring to FIG. 2, the frame of the transducer 1 is the form of a cylindrical member having a flange 1'. The cylindrical member is bored centrally at 2, and counter-bored at 3. The bore 2 terminates in a shoulder 4 through which a central bore 5 is provided. Axially aligned cross bores 6 and the single bore 7 extend perpendicular to the axis of the cylinder. The cylindrical member carries a set screw 8. A screw 9 with a threaded shank 11, has a head 10 positioned in the bore 2 against the shoulder 4, and extends axially and outwardly through the bore 5. Mounted on the shank 9 are ceramic insulating separators 12, one on each side of the spring assemblies 13, 13', 14 and 14', (see FIGS. 2 and 6), and a separator 17 and insulating plate 17 carrying bores 18' clamped by a nut 19.

The armature 20 carrying a flange 21 is positioned in the bore 2 with the flange 21 positioned in the counter-bore 3. The armature carries an extension 42 which is positioned between flexures 43, separated by sleeve separator 45' and mounted in the adapter support 44. The flexures 43 are of sheet metal relieved by semi-circular arcuate slots 44, 45 and 46 (see FIG. 7), and carrying a central bore through which the extension 42 passes. This mounting provides for motion of the armature which is substantially an in line axial motion when the force transmitting extension 42 is deflected. The threads 46' are covered by a cap 47 screwed thereon.

The armature 20 carries a cross-bore in which an insulating armature pin such as sapphire pin 25, is fixedly mounted, the pin extending through the bore 6 externally of the surface of the frame 1, each end carrying metallic caps 26 and 26'. The armature is also cross-bored by a bore 23 which is coaxial with bores 24 in the frame 1, see FIG. 3.

The springs 13 and 14, and 13' and 14' (see FIG. 6), have a triangular spring section and a tab extension 15 and 15', 16 and 16' which extend externally of the ceramic supports 12 in a direction perpendicular to the height of the triangle of the triangular springs 13 and 13', 14 and 14'. The ceramic supports position the springs in a coplanar position and insulate the pins from each other and the frame. The apexes of the springs are spaced so that the pin 25 is midway between the apexes, pins 33 and 33', 36 and 36', see FIGS. 4, 5 and 6, are mounted adjacent to, and coplanar with pin 25 when the bores 23 and 24 are aligned. These pins are insulating pins, for example, sapphire pins carrying metallic caps similar to 26 and 26'. Mounted adjacent thereto, but not necessarily coplanar with the aforesaid pins are terminal pins 37, 37', 38 and 38', there being two on each side, see FIGS. 5 and 6.

Slidably mounted in the bore 2 is a piston 28 counter-bored at each end. One counterbore receives the head 10. One piston end is positioned at the bore 7. The other end of the piston 28 carrying the counterbore 27 receives a coil spring 30, one concentric end fixedly mounted in the piston 28, and the other concentric end in the armature 20. The set screw 8 is positioned at the external surface of the piston.

The strain wire section 32' is (see FIGS. 2, 6 and 12) fixedly connected to the metallic cap of the pin 33', extends to and is electrically connected to the spring 13' at its apex, and the wire from said apex (see wire section 32), is connected to the cap 26 on the armature pin, and the wire (see wire section 31) extends from the cap 26 to the apex of the spring 13, and from apex of the spring 13 (see wire section 31'), to the cap of pin 33. In like manner, the wire section 41' extends from the cap 36' to the apex of the spring 14', and from apex of the spring 14', the wire section 41 extends to the cap 26', and from the cap 26', the wire section 40 extends to the apex of the spring 14, and from the apex of the spring 14, the wire section 40' extends to the cap of the pin 36. The wires are electrically connected at each of the pins and at the apexes. The wire section may be separate strands separately mounted. However, because of the geometry of the construction, a single strand may be wound back and forth between the caps and springs, and electrically and mechanically connected at the caps and the apexes of the springs.

Electrical cross connections are made between the pins 33 and the pins 38, from the pin 38 to the pin 37, and from the pin 37 to the pin 36. An electrical connection is made between the pin 33' and the pin 38', from pin 38' to the pin 37', and from pin 38' to the pin 36'. Electrical leads are connected to each of the springs forming the input and output leads 20'' and 20', 39 and 39' for connection to the terminal connector 48. The leads are each positioned in one of the four bores 18'.

Alternatively the bridge may be connected as an open bridge to permit introduction of balancing and compensating resistors if necessary, and is conventional in the art. This connection forms the wires into a four-arm Wheatstone bridge as illustrated in FIG. 12.

Prior to mounting the strain resistive wires, a pin is inserted in the bores 23 and 24 (see FIG. 3) to lock the armature in null position. The bores 24 and 23 being axially oriented when there is no force exerted on 47. After the wires are mounted the bridge is excited by an applied voltage and the output voltage is noted while the alignment pin is in position in bores 23 and 24, and all wires are under about equal tension. When the alignment pin is withdrawn, the tension in the wires will cause displacement of armature 20, thereby changing the output voltage. The previous neutral position of armature 20 established when the pin was in position, can now be restored by moving piston 28 with a suitable tool inserted in bore 7 and locking piston 28 in correct position by means of set screw 8. If it is desired to increase or reduce the tension in wires 31, 32, 40 and 41, and also conversely decrease or increase the tension in 32', 41', 40' and 31', to obtain a mechanical bias and an initial output voltage at zero load, the set screw is released and by inserting a tool in the bore 7, the piston 28 is moved towards or away from the armature 20 until the output of the bridge shows the desired value. The set screws are secured to hold the piston in position to exert the desired bias and thus, produce a balanced bridge. If an unbalanced bridge is desired, the set screw is released, the piston is moved to or away from the armature, changing the bias until the desired bridge unbalance and bridge output is obtained. The set screw is secured to hold the position of the piston in the required position.

As is illustrated in FIG. 9, the transducer can be converted into a load cell by mounting the load cell adapter 49 which carries a flexure 50 mounted in the wall of 51 of the adapter 49. Centrally mounted in the flexure 50 is a sleeve 51' into which the terminal end 47 is freely positioned. The sleeve 51' is internally threaded to receive a screw 52 positioned therein. When the adapter 49 is threaded on the external threads 53 of the transducer, it is possible that the abutment of the end 47, against the screw 52, may cause a deflection of the armature. In order to avoid this and to be sure that a correct zero is established, the screw 52 is screwed in to remove the deflection. It will then appear that any load imposed upon the sleeve 51' axially of the unit, as for example, by connecting into a source of compressive force, will cause a deflection of 47 to be recorded.

Figure 1:
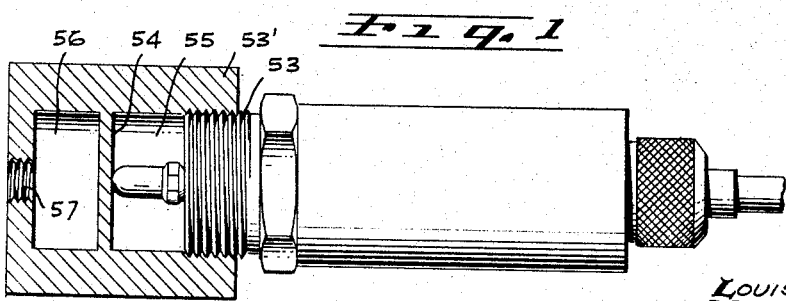
FIG. 1 is an external plan view showing also one form of adapter.

FIG. 1 shows an adapter which converts the unit into a pressure gage. In this case, the adapter 53' carries a central diaphragm flexure 54, producing a cavity 55 and 56, with entrance port 57. The adapter 53' is screwed onto the thread 53 and adjusted so that some deflection occurs, as measured by an electrical voltage output at the output terminals, and an output is recorded and is backed off until the deflection is removed and the Wheatstone bridge brought to balance.

FIG. 11 shows the mounting of the transducer for a weighing device. The adapter, in this case, shown at 58, is screwed onto the thread 53 and it carries a fulcrum support 59, mounted by a screw 60 in the bottom 60' of the adapter. The adapter is cross grooved to permit the mounting of the weighing beam 61 counterbalanced by the counterbalance 62. The unit is adjusted by screwing it into position until some deflection occurs, as measured by an output as above, and the balancing weight is adjusted until the deflection is removed, in which case, the unit is at zero position.

While we have described particular embodiments of our invention for the purpose of illustration, it should be understood that various modifications and adaptations thereof may be made within the spirit of the invention, as set forth in the appended claims.

I claim:

1. An electrical strain wire transducer comprising a frame, an armature, flexural means connected to said frame for mounting said armature, force transmitting means connected to said armature, a tubular case for said transducer connected to said frame, an axial bore in said frame, said armature mounted on said flexure for in-line motion in said axial bore, a pair of axially aligned transverse bores in said frame, an insulating pin mounted in said armature and extending through said transverse bores and terminating externally of said frame, a second pair of transverse bores in said frame and a bore in said armature adapted to be axially aligned with each of said second pair of transverse bores, two pairs of flat spring members mounted on said frame, coplanar with each other and insulated from each other and said frame and spaced from said insulating pin, two of said springs extending externally of said frame on one side of said frame and two of said springs extending externally of said frame on the opposite side of said frame, two insulated terminal pins mounted on said frame adjacent said first mentioned insulating pin on one side of said frame and two insulated terminal pins mounted on the other side of said frame adjacent said first mentioned insulating pin, electrically strain sensitive resistance wires extending in tension on opposite sides of said frame from one of said terminal pins to one of said springs and from said one spring to said first mentioned insulating pin and from said first mentioned insulating pin to another of said springs and from last mentioned spring to another of said terminal pins, and electrical cross connections between said terminal pins for connection of said strain wires into a Wheatstone bridge formation.

2. The transducer of claim 1, means for connecting force adapters to said frame and force transmitting means connected to said armature.

3. The transducer of claim 1, a piston movably mounted in the axial bore of said frame between said armature and said springs, a spring connected to one end of said piston and to said armature, and means to adjust and fix the position of said piston in the axial bore of said frame to adjust the spring bias on the armature.

4. The transducer of claim 3, means for connecting force adapters to said frame and force transmitting means connected to said armature.

References Cited

UNITED STATES PATENTS

| 2,835,774 | 5/1958 | Statham | 73—88.5 XR |
| 3,058,348 | 10/1962 | Statham | 73—398 |

RICHARD C. QUEISSER, *Primary Examiner.*

C. A. RUEHL, *Assistant Examiner.*